United States Patent [19]
Ide

[11] Patent Number: 5,251,932
[45] Date of Patent: Oct. 12, 1993

[54] FRONT BODY STRUCTURE OF AUTOMOTIVE VEHICLE

[75] Inventor: Yoshikazu Ide, Hiroshima, Japan

[73] Assignee: Mazda Motor Corporation, Hiroshima, Japan

[21] Appl. No.: 762,340

[22] Filed: Sep. 19, 1991

[30] Foreign Application Priority Data

Sep. 26, 1990 [JP] Japan ................................. 2-254319

[51] Int. Cl.⁵ .............................................. B62D 21/15
[52] U.S. Cl. ...................................... 280/784; 180/147; 296/204
[58] Field of Search ........................ 280/784, 781, 777; 180/232, 147; 296/204, 194, 189

[56] References Cited

U.S. PATENT DOCUMENTS 3,578,782  5/1971  Miyoshi .................................. 180/232
4,786,076 11/1988  Wierschem ........................... 280/777
4,817,973  4/1989  Takeda ................................. 296/204

FOREIGN PATENT DOCUMENTS

2653730  5/1991  France ................................. 280/777
63-68474  3/1988  Japan .................................. 280/781
2-283579 11/1990  Japan .................................. 280/777

Primary Examiner—Karin L. Tyson
Attorney, Agent, or Firm—Keck, Mahin & Gate

[57] ABSTRACT

A front body structure of a vehicle includes a pair of front side frames extending on opposite sides of an engine room in a lengthwise direction, from front to back, of the vehicle. A suspension cross member extends in a direction crosswise relative to the front side frames and suspends front wheels of the vehicle. Finally, a shock relieving member is provided, in association with the suspension cross member, for relieving shocks exerted on the suspension cross member from a power train forcibly moved rearward during a front end collision of the vehicle.

7 Claims, 5 Drawing Sheets

FRONT BODY STRUCTURE OF AUTOMOTIVE VEHICLE

BACKGROUND OF THE INVENTION

1. Field of the Invention

The present invention relates to part of the body structure of a vehicle and, more particularly, to the front body structure of a car body which suppresses deformation of a cabin of a car body during a collision and which dissipates and relieves impacts or shocks on the car body during the collision.

Typically, the front body portion of a vehicle is provided with a suspension cross member extending at the rear end portion of an engine compartment or room between a pair of front frames generally placed on opposite sides of the engine room. A power train, formed by the engine, a transmission, a differential, etc., is disposed forward of the vehicle body, relative to the suspension cross member, in the engine room.

2. Description of Related Art

Considering the vehicle to be subjected to a straight-on, front-end collision, if an impact on the vehicle is slight, the energy delivered to the front body structure is absorbed by a collapse of what is called a "crash space", which includes spacial volumes formed, e.g., between the front portion of the engine room and the power train, between the power train and the suspension cross member, and between the suspension cross member and a dash panel. However, if the impact is sufficiently high, the engine room will collapse too much for the crash space to absorb the impact. That is, the power train will collide with the suspension cross member, located rearward of the vehicle relative to the power train, due to the collapse of the engine room. Furthermore, the suspension cross member typically interferes with the dash panel separating the engine room from the cabin so as to thrust the dash panel in the rearward direction toward the cabin of the car body. This results in deformation of the cabin.

For suppressing the deformation of the cabin so that it is as small as possible in order to assure the safety of the occupants of the cabin, it is clear that the crash space in the engine compartment should be made as large as possible. However, there are limits to the permissible dimensions of the crash space, because enlarging the crash space in the engine room necessitates a decrease in cabin space.

A structure suitable for enlarging the crash space in the engine room, requiring no decrease in cabin space, is known from, for instance, Japanese Utility Model Publication No. 61-7963. The front body described in this publication is structured such that when the power train is forced rearward, due to a front-end collision, and collides with the suspension member, the suspension member and a part mounting the suspension member are ruptured or broken. In this known front body structure, the suspension member is designed to collapse or crush sufficiently to eliminate the need to decrease cabin space.

However, in such a front body structure, which allows the suspension member itself to collapse during a collision of the vehicle, the action of shocks caused by the collapse of the suspension member during a collision of the vehicle causes a dynamic weight transfer in the cabin. Injuries to cabin occupants, therefore, may occur.

SUMMARY OF THE INVENTION

A primary object of the present invention is, therefore, to provide a front body structure of a car body which is able to relieve impacts or shocks caused during a collision of a vehicle.

Another object of the present invention is to provide a front body structure of a car body which is able to minimize the deformation of a vehicle cabin during a collision of a vehicle.

These and other objects of the present invention are accomplished by providing a front body structure of a car body including a pair of front side frames extending on opposite sides of a power train, respectively, in a lengthwise direction, from front to back, of the vehicle. A suspension cross member extends behind the power train in a direction crosswise relative to the front side frames for suspending front wheels. The suspension cross member is integrally formed with shock relieving means for relieving shocks exerted on the suspension cross member from the power train during a collision of the vehicle.

According to a specific preferred embodiment of the present invention, the shock relieving means comprises a surface, formed in the suspension cross member, facing the power train. The surface is preferably inclined upward in the lengthwise direction.

According to another specific preferred embodiment of the present invention, the front body structure further comprises mounting means for mounting a steering rack on the suspension cross member. The mounting means is secured to the suspension cross member below a horizontal plane in which shocks are exerted on the steering rack from the power train during a collision of the vehicle.

Because the shock relieving means, such as the surface, inclined upwards from front to back, faces the rear portion of the power train in front of the suspension cross member, when the power train is thrust backward or rearward due to a front end collision of the vehicle and collides with the suspension cross member, the power train can ride up over the suspension cross member along the shock relieving means. That is, the crash space can be enlarged solely by an overlap caused by the power train riding up over the suspension cross member. Accordingly, deformation of the vehicle cabin can minimized. Further, because shocks or impacts, acting on the suspension cross member and caused while the power train rides up over the suspension cross member, are resolved into two force components, namely, a force component along the inclined surface of the suspension cross member and a force component perpendicular to the inclined surface, the shock or impact caused during a collision is relieved when the power train rides up over the suspension cross member.

Additionally, in a case in which an elastic member is installed on the inclined surface of the suspension cross member, the impact, caused by the power train collapsing, with the inclined surface of the suspension cross member is partially absorbed by the elastic deformation of the elastic member and by the frictional interaction of the power train against the elastic member, so that the impact can be relieved to a greater degree.

Moreover, when the steering rack is fixedly mounted on the suspension cross member, because the mounting means is secured to the suspension cross member below a horizontal plane in which shocks are exerted on the steering rack from the power train during a collision of the vehicle, when the power train collides and interferes with the steering rack, the mounting means is easily detached from the suspension cross member so as to allow the steering rack to become free from the suspension cross member. This results in an increase in the size of the crash space, in a minimized deformation of the vehicle cabin, and in relieving the shock or impact when the power train collides with the steering rack.

BRIEF DESCRIPTION OF THE DRAWINGS

The above and other objects and features of the present invention will be apparent to those skilled in the art from the following description of preferred embodiments thereof when considered in conjunction with the accompanying drawings, in which the same reference numerals have been used to designate the same or similar elements throughout the drawings and.

DETAILED DESCRIPTION OF THE PREFERRED EMBODIMENTS

Because the structure forming the engine room of the present invention, including, for instance, front frames, a dash panel, etc., is generally well known in its construction to those skilled in the art, the present description will be directed to only those elements forming part of, or cooperating directly with, a front body structure in accordance with the present invention. It is to be understood that elements not specifically shown or described can take various forms well known to those skilled in the automotive vehicle art.

Referring now to the drawings in detail and, in particular, to FIGS. 1 to 5, a part of the front body 11 according to a preferred embodiment of the present invention is shown as comprising a suspension cross member 1 attached or secured to front side frames 11A (only one of which is shown for clarity) and extending between suspension frames 11B (only one of which is shown for clarity). The suspension cross member 1 is formed with a portion forming a baseplate 2 having a generally U-shaped cross section as viewed in the lengthwise direction of the car body from the front toward the rear. The generally U-shaped suspension cross member 1 is integrally formed with rear extensions 3 extending from the opposite transverse ends of the baseplate 2. Each rear extension 3 has a rear end portion 4 extending laterally therefrom and is formed with a pair of mounting holes 5. The generally U-shaped suspension cross member 1 is further integrally formed with front extensions 6 extending from the opposite transverse ends of the baseplate 2 and raised upward. Each front extension 6 is formed with a mounting hole 7. The suspension cross member 1 is secured to each of the front side frames 11A by fixing bolts (not shown) through the mounting holes 5 and 7.

Figure 1:
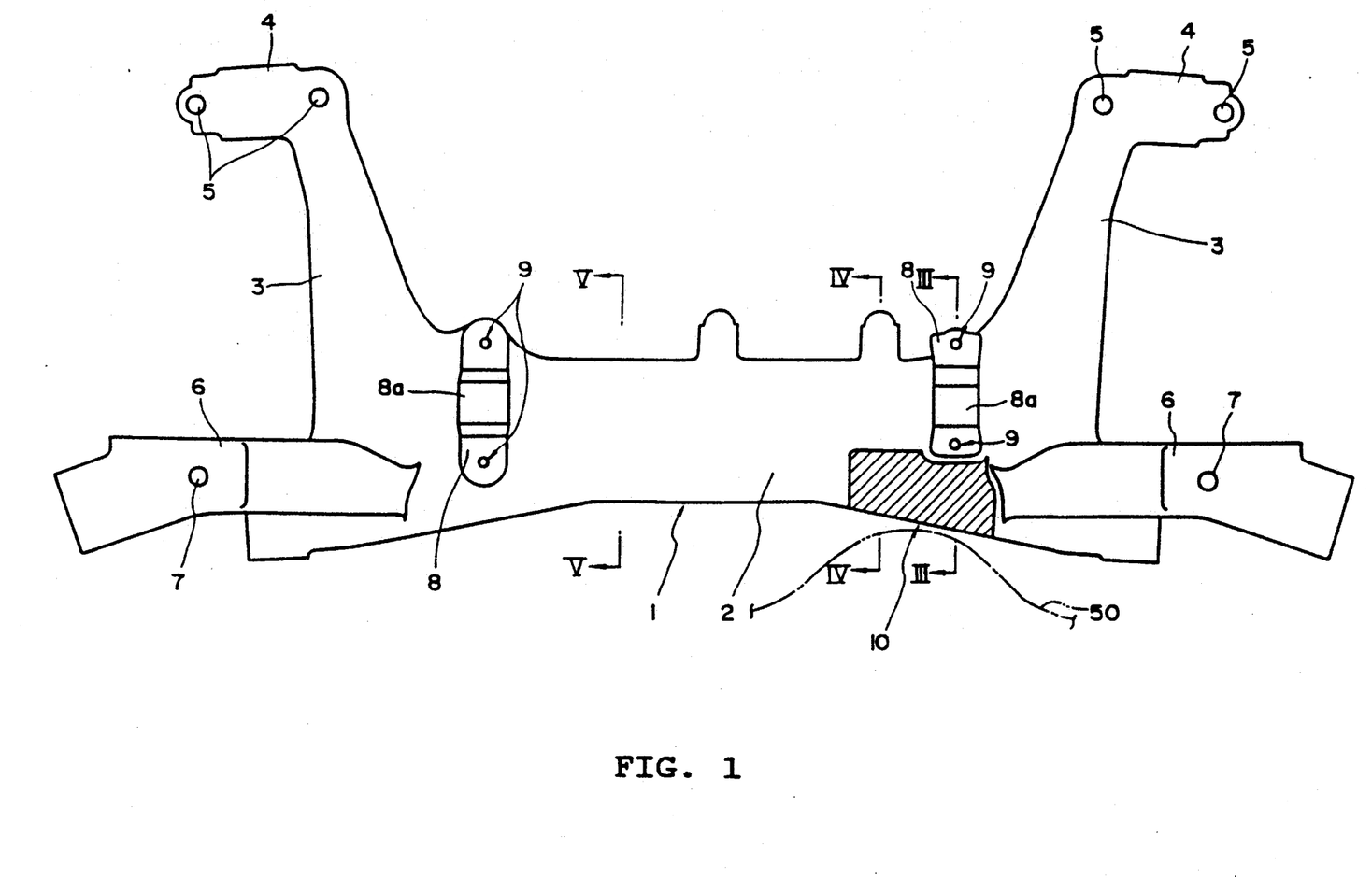
FIG. 1 is a schematic plan view of a suspension cross member installed in the front body structure of a vehicle according to a preferred embodiment of the present invention.
Figure 2:
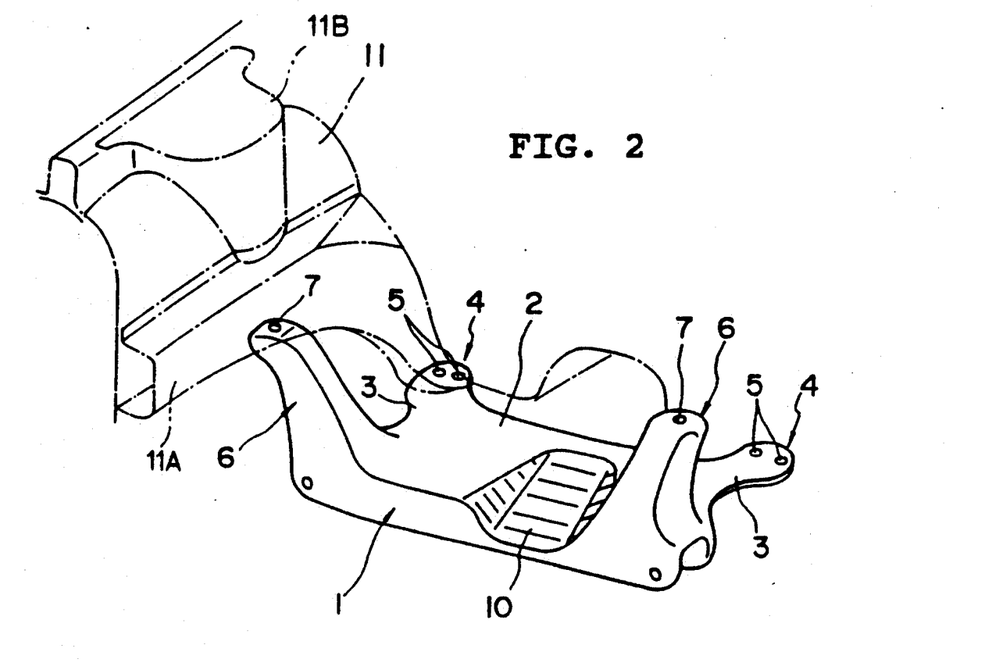
FIG. 2 is a perspective view of the front body structure according to a preferred embodiment of the present invention in which the suspension cross member is mounted.

The suspension cross member 1 is further formed with a pair of steering rack clamping portions 8, with steering rack mounting holes 9, on the baseplate 2. These steering rack clamping portions 8 are mutually separated by a distance in the lengthwise direction of the suspension cross member 1 between the front extensions 6. A steering rack 12 is mounted by steering rack mounting brackets (not shown) secured by clamping means, such as bolts or the like, through the steering rack mounting holes 9.

The suspension cross member 1, thus structured, is formed with a shock relieving means, such as a surface 10 formed as a bottom of a recessed portion, sloping or inclined upward from front to back. The inclined surface 10 is placed so as to face the rear portion of the power train. This inclined surface 10 is more clearly shown in FIGS. 3 and 4, which are cross sections along lines III—III and IV—IV of FIG. 1, respectively. As is clear from FIGS. 3 and 4, the bottom surface 10 of the recessed portion is inclined upward from the front of the vehicle body (the left side in FIGS. 3 and 4) to the rear of the vehicle body (the right side in FIGS. 3 and 4).

Figure 3:
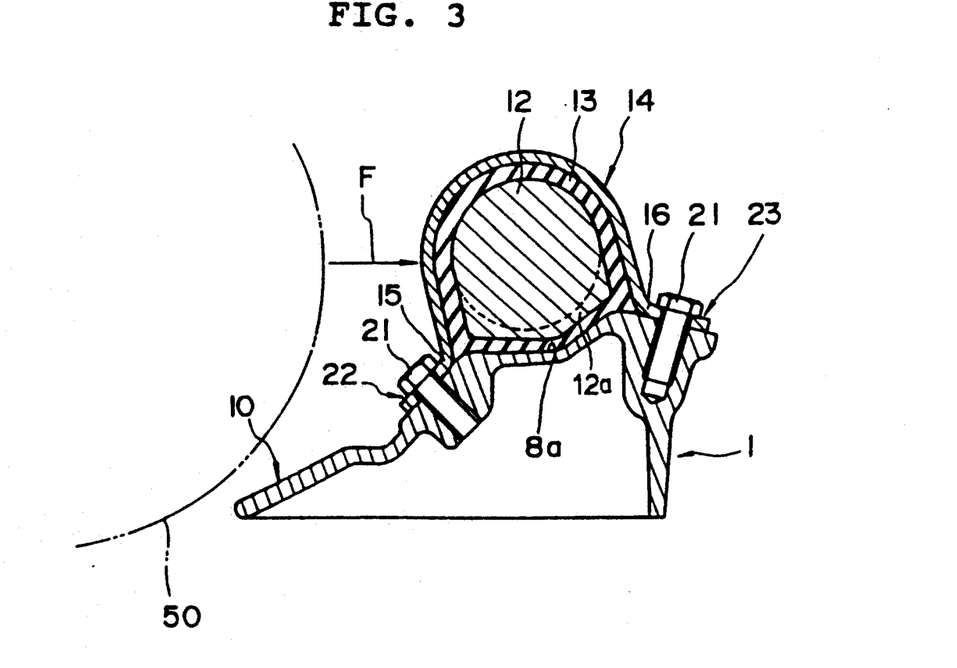
FIG. 3 is a side sectional view of the suspension cross member along line III—III of FIG. 1.
Figure 4:
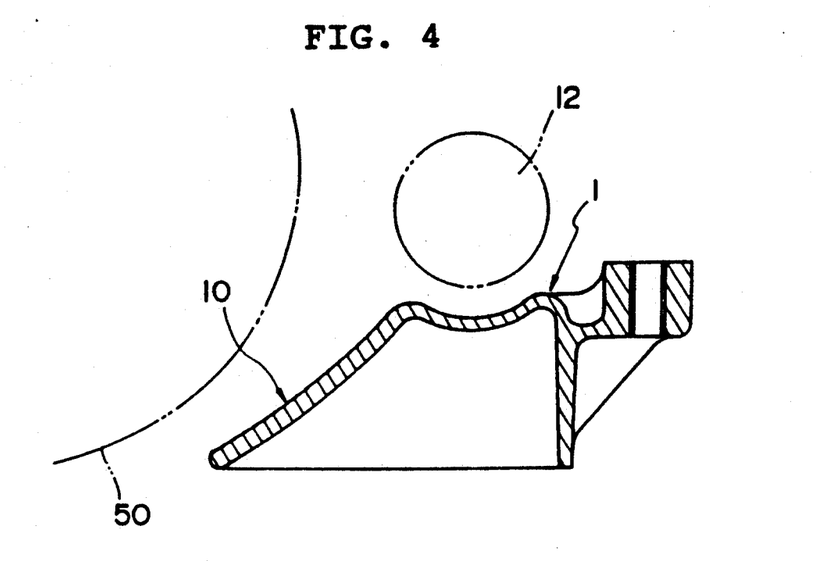
FIG. 4 is a side sectional view of the suspension cross member along line IV—IV of FIG. 1.
Figure 5:
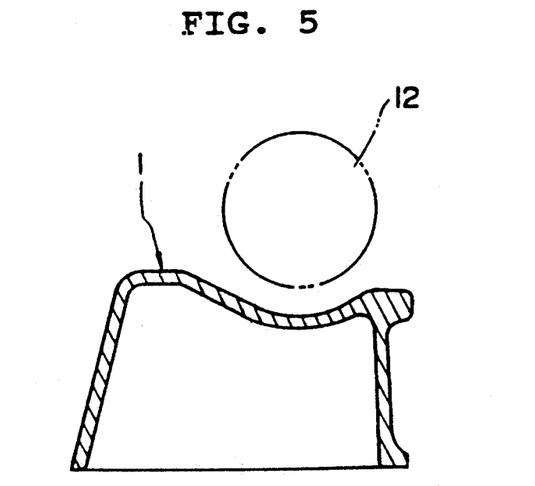
FIG. 5 is a side sectional view of the suspension cross member along line V—V of FIG. 1.

As is clear from FIGS. 3 to 5, showing cross sections of the suspension cross member 1, the inclined surface 10 is formed in a specific portion of the suspension cross member 1 which is, in this embodiment, the portion facing a rear part of the power train 50. This rear part of the power train 50 may be a differential unit, projecting rearward, which is disposed in front of the suspension cross member 1. However, the portion of the suspension cross member 1 in which the inclined surface 10 is formed may be suitably determined according to the extent of the range over which the power train 50 and suspension cross member mutually interfere or overlap. The suspension cross member 1 has a channel-shaped cross section on both sides of the inclined surface 10.

In the front body structure described above, including the suspension cross member 1 shown in FIGS. 1-5, the inclined surface 10, inclined upward from the front to the rear of the vehicle, is formed in that portion of the suspension cross member 1 which faces the rear portion of the power train 50. In this embodiment, this rear portion is formed by the differential unit which is located closest to the suspension cross member 1 and is the unit with which the suspension cross member and steering rack 12 collide when the power train 50 moves rearward during a front-end collision of the vehicle. Accordingly, when the power train 50 moves rearward toward the suspension cross member 1 during a front-end collision of the vehicle, the power train 50 is forced to ride up over the inclined surface 10 of the suspension cross member 1. Allowing the power train 50 to ride up over the inclined surface 10 of the suspension cross member 1 increases the crash space between the power train 50 and the suspension cross member 1, since the power train 50 is allowed to ride up over the suspension cross member 1. Furthermore, when the power train 50 rides up over the suspension cross member 1, an impact load or force, received by the suspension cross member 1 in an approximately horizontal direction, is divided by the inclined surface 10 into two components of force, namely, a force directed rearward and up along the inclined surface of the inclined surface 10 and a force directed perpendicularly to the inclined surface of the inclined surface 10, so that the impact load or force which the suspension cross member 1 receives can be dispersed and relieved.

Since the suspension cross member 1 has a channel-shaped cross section on both sides of the inclined surface 10, it provides a high flexural rigidity, so that the suspension cross member 1 may be designed, as a whole, to be small in size and light in weight.

It is preferred to affix an elastic member, such as a rubber plate or the like, on the surface of the inclined surface 10 to absorb part of the impact load or force received by the inclined surface 10 of the suspension cross member 1 from the power train 50 through elastic deformation of the elastic member and mutual friction between the power train 50 and the elastic member. This results in relieving the impact load or force more efficiently and in preventing the suspension cross member 1 from being broken. Furthermore, as was previously described, although the inclined surface 10 is formed in a portion of the suspension cross member 1 where, in this embodiment, the power train 50 interferes with the suspension cross member 1, the inclined surface 10 may be formed in any preferred portion and have any desired width according to design requirements.

Figure 6A:
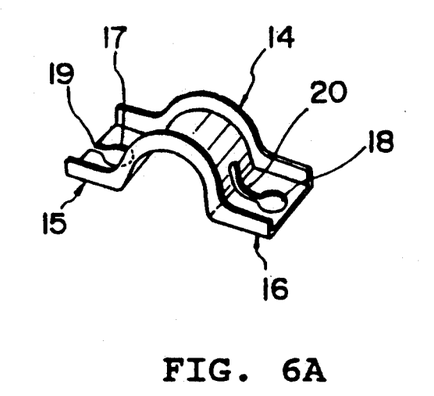
FIGS. 6A-6C are perspective views showing, completely or partially, different types of mounting brackets for fixedly mounting a steering rack on the suspension cross member.

Referring to FIG. 6A in conjunction with FIG. 3, a steering rack mounting bracket 14 is clamped to the steering rack clamping portion 8 of the suspension cross member 1, by bolts 21, for mounting the steering rack 12 on the suspension cross member 1 through a bush 13. The steering rack clamping portion 8 is provided with a seating surface 8a, in the form of a recess having a V-shaped cross section, in the suspension cross member 1. A portion of the steering rack 12, which is placed on the V-shaped seating surface 8a of the steering rack clamping portion 8, is formed with a collar 12a having an external profile corresponding to the cross section of the V-shaped seating surface 8a of the steering rack clamping portion 8. The bush 13, which has internal and external annular peripheral surfaces conforming, in external shape, to the seating surface 8a of the steering rack clamping portion 8 and, in internal shape, to the collar 12a of the steering rack 12, is installed on the collar 12a of the steering rack 12. The structure formed by the collar 12a of the steering rack 12 and the bush 13 ensures that the steering rack 12 is placed in position with respect to the clamping portion 8 of the suspension cross member 1. The steering rack mounting brackets 14, each of which has a symmetrical arch shape fitting the external periphery of the bush 13, are clamped to the steering rack clamping portions 8 by bolts 21 so that the steering rack 12 is fixedly mounted on the suspension cross member 1. As is shown in FIG. 3, the position at which the steering rack 12 is clamped is lower than the position at which the line of action F of the impact load acts on the steering rack 12 due to a rearward movement of the power train 50. That is, the locations at which bolts 21 are fastened, i.e., front and rear clamping positions 22 and 23 of the steering rack mounting bracket 14 and, in particular, the rear clamping position 23, are established lower than the line of action F of the impact load acting on the steering rack 12 when the rear portion of the power train 50 collides with the steering rack 12.

As is shown in detail in FIG. 6A, the steering rack mounting bracket 14 is an arch-shaped metal fitting having front and rear leg portions 15 and 16. The front and rear leg portions 15 and 16 ar formed with circular mounting holes 17 and 18 having slots 19 and 20, respectively. The slot 19 of the front leg portion 15 extends to and opens along the front edge of the front leg portion 15. The slot 19 has a width smaller than the diameter of the mounting hole 17 and is forcibly enlarged by the bolt 21 when the steering rack 12 is pushed rearward by the power train 50 during a collision. The slot 20 of the rear leg portion 16, extending forward from the circular mounting hole 18, has a width smaller than the diameter of the circular mounting hole 18 and is forcibly enlarged by the bolt 21 when the steering rack 12 is pushed rearward by the power train 50 during a collision.

These slots 19 and 20 of the bracket 14, which are able to be expanded by the bolts 21, allow the steering rack 12 to move rearward relative to the suspension cross member 1 when the steering rack 12 is forced rearward by the power train 50. When the automobile is subjected to a front-end collision or the like, the power train 50 rides up over the inclined portion 10 of the suspension cross member 1, due to an impact load or force, and collides with the steering rack 12. During the collision of the power train 50 with the steering rack 12, the steering rack 12 pushes the bracket 14 rearward so that the slots 19 and 20 of the steering rack mounting bracket 14 are forcibly enlarged by the bolts 21. As the steering rack 12 moves rearward, the steering rack mounting bracket 14 escapes from the bolt 21 via the enlarged slot 19 and is finally bent up along the root of the rear leg portion 16. In this way, the steering rack 12 is allowed to move further rearward relative to the suspension cross member 1. As is apparent from the above description, the steering rack 12 is mounted on the suspension cross member 1 by the mounting brackets 14, secured to the suspension cross member 1 at a vertical position lower than a horizontal plane F in which an impact or shock load is exerted on the steering rack 12 from the power train 50 when the power train 50 collides and interferes with the steering rack 12 during a collision of the vehicle. Consequently, the steering rack mounting brackets 14 are easily deformed sufficiently to permit the steering rack 12 to detach and separate from the suspension cross member 1. Such separation of the steering rack 12 from the suspension cross member 1 increases the crash space in the engine room. The deformation of the steering rack mounting brackets 14 helps to relieve an impact load or force acting on the suspension cross member 1.

Figure 6B:
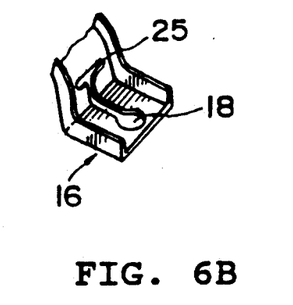
Figure 6C:
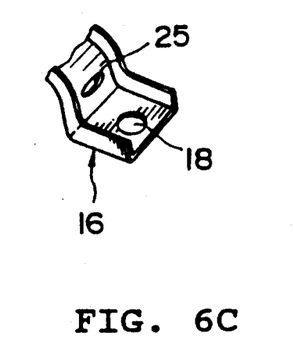

In place of the slots 19 and 20, formed in the front and rear leg portions 15 and 16 of the steering rack mounting bracket 14 and allowing the steering rack mounting brackets 14 to escape from the bolts 21 so as to free the steering rack 12 easily from the suspension cross member 1, the bracket 12 may be formed to be breakable by suitably selecting materials from which the bracket 12 is made and the strength of the material forming the bracket 12. Otherwise, the mounting holes 17 and 18 may be made sufficiently wide to allow the steering rack mounting bracket 14 to easily escape from the bolts 21. Further, in order for the steering rack mounting bracket 14 to easily bend up along the root of the rear leg portion 16 of the steering rack mounting bracket 14, it is preferred to form an opening 25 near the root of the rear leg portion 16 of the steering rack mounting bracket 14, as is shown in FIGS. 6B and 6C.

Figure 7:
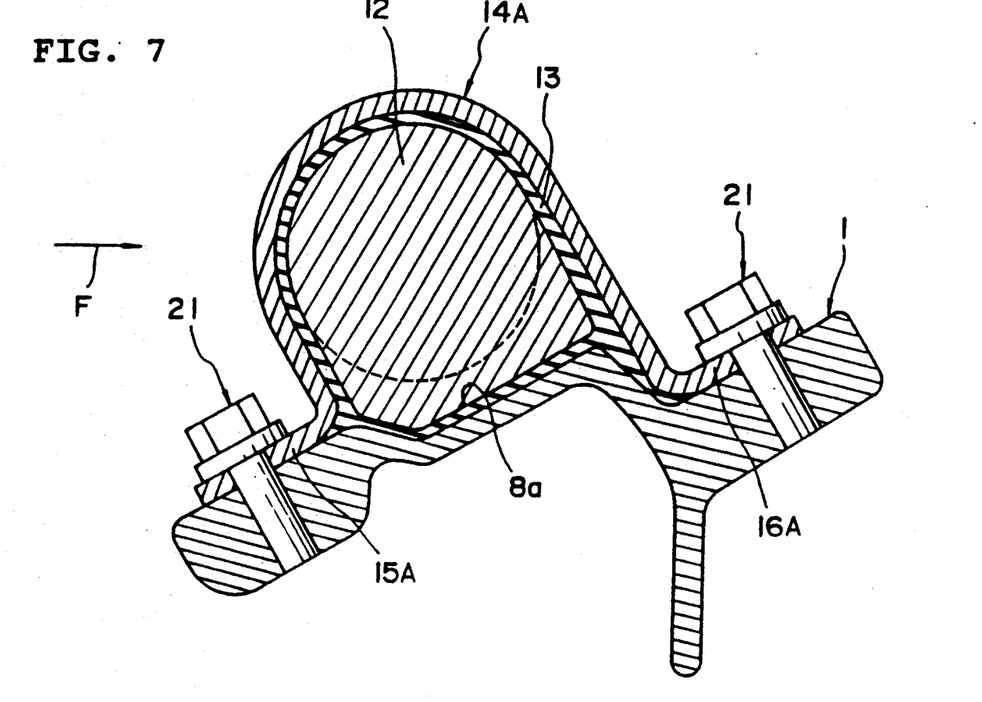
FIG. 7 is a side sectional view of a steering rack mounting structure of a front body structure according to another preferred embodiment of the present invention.

Referring to FIG. 7, showing a front body structure in accordance with another preferred embodiment of the present invention, a steering rack mounting means, such as a bracket 14A, for mounting a steering rack 12 on the suspension cross member 1 is formed asymmetrically as viewed in the lengthwise direction of a car body. Specifically, the steering rack mounting bracket 14A is formed so that when attached to a suspension cross member 1, a rear leg portion 16A of the steering rack mounting bracket is located behind a front leg portion 15A.

The rear leg portion 16A of the steering rack mounting bracket 14A is located even further below a horizontal plane F, in which an impact or shock load is exerted on the steering rack 12 by the power train 50 during a collision of the vehicle, than in the previously described embodiment. Consequently, the clamping bolt 21 for the rear leg portion 16A of the steering rack mounting bracket 14A does not resist the impact load or force strongly when the steering rack 12 is forced rearward. Accordingly, when the power train 50 collides with the steering rack 12, the steering rack mounting bracket 14A escapes from the bolt 21 for the front leg portion 15A and, simultaneously, bends rearward at the root of the rear leg portion 16A. When the steering rack mounting bracket 14A bends rearward, the steering rack 12 is allowed to be forced rearward. In this embodiment, because the rear leg portion 16A of the steering rack mounting bracket 14A is located sufficiently behind the front leg portion 15A, the steering rack 12 and the head of the rearward bolt 21 do not interfere while the steering rack 12 is forced rearward by the rearward movement of the power train 50. This is significantly different from the previous embodiment. Accordingly, when the steering rack 12 is forcibly moved rearward by the power train 50, not only is the impact load or force more effectively suppressed, but also, the crash space is collectively enlarged.

Figure 8:
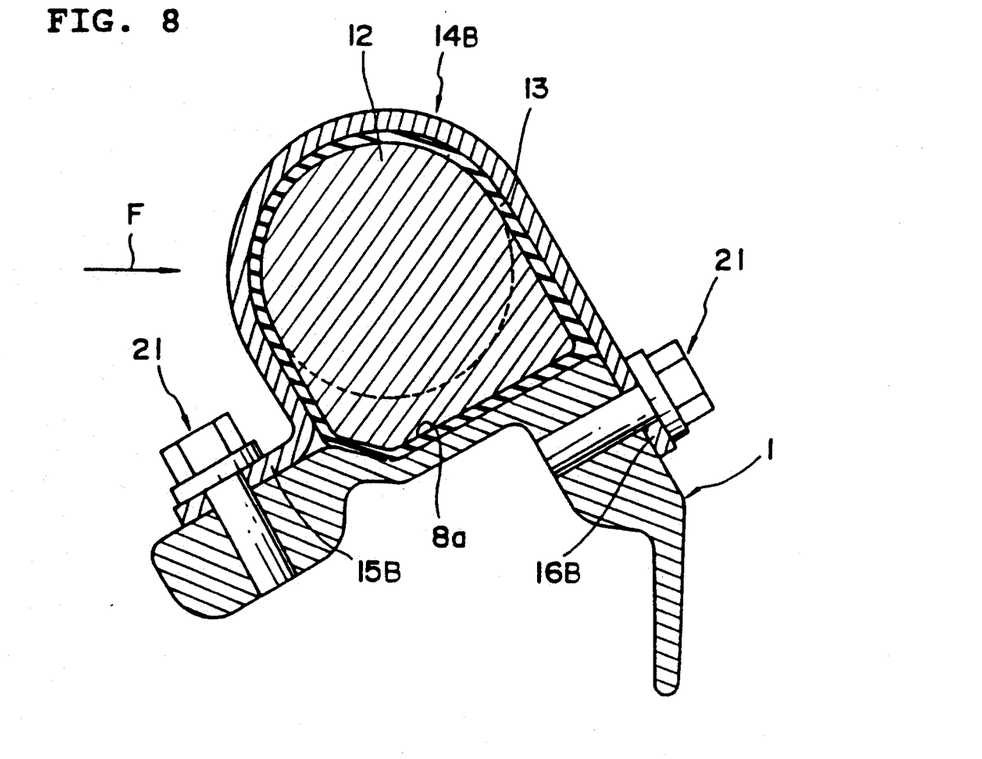
FIG. 8 is a side sectional view of a steering rack mounting structure of a front body structure according to still another preferred embodiment of the present invention.

Referring to FIG. 8, showing a front body structure in accordance with a further preferred embodiment of the present invention, a steering rack mounting bracket 14B for mounting a steering rack 12 is formed asymmetrically as viewed in the lengthwise direction of a car body. Specifically, the steering rack mounting bracket 14B has a front leg portion 15B, bent forward, and rear leg portion 16B, extending straight downward from the steering rack mounting bracket 14B. The rear leg portion 16B of the steering rack mounting bracket 14B is located below a horizontal plane F, in which an impact or shock load is exerted on the steering rack 12 from the power train 50 during a collision of the vehicle, and is secured to the rear surface of the suspension cross member 1. The front body structure of this embodiment manifests operations and effects similar to those of the previously described embodiments.

The front body structure for mounting the steering rack 12 on the suspension cross member 1 may, of course, be adopted with or without the inclined portion 10 formed in the suspension cross member 1. Jointly providing both the inclined portion and the steering rack mounting bracket in the front body structure for mounting the steering rack 12 on the suspension cross member 1 more effectively expands the crash space provided in the engine room and relieves an impact load or force acting on the suspension cross member 1 while the power train 50 collides with the suspension cross member 1 and the steering rack 12 during a collision.

It is to be understood that although the present invention has been described in detail with respect to preferred embodiments thereof, various other embodiments and variants may occur to those skilled in the art which fall within the scope and spirit of the present invention. Such other embodiments and variants are intended to be covered by the following claims.

What is claimed is:

1. A front body structure of a vehicle comprising:
   a power train;
   a pair of front side frames extending on opposite sides of said power train in a lengthwise direction, from front to back, of said vehicle;
   a suspension cross member extending, behind said power train, in a direction crosswise relative to said pair of front side frames for suspending front wheels; and
   shock relieving means, integrally formed with said suspension cross member, for relieving shocks exerted on said suspension cross member by said power train during a collision of said vehicle, said shock relieving means comprising a recessed portion formed in said suspension cross member facing said power train, said recessed portion including a surface which is inclined upward in the lengthwise direction from a front edge of said suspension cross member.

2. A front body structure as recited in claim 1, and further comprising an elastic member affixed to said surface of said suspension cross member.

3. A front body structure of a vehicle comprising:
   a power train;
   a pair of front side frames extending on opposite sides of said power train in a lengthwise direction, from front to back, of said vehicle;
   a suspension cross member placed behind said power train and extending in a direction crosswise relative to said pair of front side frames for suspending front wheels; and
   mounting means for mounting a steering rack on said suspension cross member, said mounting means being secured to said suspension cross member below a line of action in which shocks are exerted on said steering rack by said power train during a collision of said vehicle, said mounting means including a steering rack mounting bracket having leg portions, at least one of said leg portions having a slot and a hole formed therein and a bolt extending through said hole to connect the at least one leg portion to said suspension cross member, said bolt forcibly enlarging said slot so that the at least one leg portion detaches from said suspension cross member during a collision.

4. A front body structure of a vehicle comprising:
   a power train;
   a pair of front side frames extending on opposite sides of said power train in a lengthwise direction, from front to back, of said vehicle;
   a suspension cross member placed behind said power train and extending in a direction crosswise relative to said pair of front side frames for suspending front wheels; and
   mounting means for mounting a steering rack on said suspension cross member, said mounting means being secured to said suspension cross member below a line of action in which shocks are exerted on said steering rack by said power train during a collision of said vehicle, said mounting means including a steering rack mounting bracket having leg portions, at least one of said leg portions having a slot and a hole formed therein and a bolt extending through said hole to connect the at least one leg portion to said suspension cross member, said bolt forcibly enlarging said slot so that the at least one leg portion becomes unfixed from said suspension cross member during a collision.

5. A front body structure as recited in claim 1, and further comprising shock relieving means, integrally formed with said suspension cross member, for relieving shocks exerted on said suspension cross member by said power train during a collision of said vehicle.

6. A front body structure as recited in claim 5, wherein said shock relieving means comprises a surface of said suspension cross member facing said power train, said surface being inclined upward in the lengthwise direction.

7. A front body structure as recited in claim 6, and further comprising an elastic member affixed to said surface of said suspension cross member.

* * * * *